(12) United States Patent
Meisel

(10) Patent No.: US 7,847,541 B1
(45) Date of Patent: Dec. 7, 2010

(54) ACTUATORS AND MOVEABLE ELEMENTS WITH POSITION SENSING

(76) Inventor: David Meisel, 7271 Kingswood Dr., Bloomfield Township, MI (US) 48301

( * ) Notice: Subject to any disclaimer, the term of this patent is extended or adjusted under 35 U.S.C. 154(b) by 860 days.

(21) Appl. No.: 11/555,862

(22) Filed: Nov. 2, 2006

Related U.S. Application Data

(60) Provisional application No. 60/732,583, filed on Nov. 2, 2005, provisional application No. 60/828,890, filed on Oct. 10, 2006.

(51) Int. Cl.
*G01B 7/14* (2006.01)
(52) U.S. Cl. ............................ 324/207.26; 324/207.17; 324/207.24
(58) Field of Classification Search ............ 324/207.24, 324/207.26, 207.15, 207.17; 123/200, 46 R, 123/46 A, 46 SC, 46 E, 612, 617; 73/514.16, 73/514.31, 514.39
See application file for complete search history.

(56) References Cited

U.S. PATENT DOCUMENTS

2003/0213355 A9* 11/2003 Meisel ..................... 84/216

OTHER PUBLICATIONS

"Linear variable differential transformer," printed from the Wikipedia website (http://en.wikipedia.org/wiki/Linear_variable_differential_transformer) and believed to have been offered for sale, publicly used, and/or published prior to the filing date of this application.

* cited by examiner

*Primary Examiner*—Bot L LeDynh
(74) *Attorney, Agent, or Firm*—Gifford, Krass, Sprinkle, Anderson & Citkowski, P.C.; Douglas L. Wathen

(57) ABSTRACT

A system senses the position of a movable element in a mechanical apparatus. The element moves along an elongated guide member, which is at least partially formed of a magnetic material. An excitation coil is positioned by the guide member and a sensing coil moves with the movable element. An excitation circuit energizes the excitation coil and a position sensing circuit sense a voltage or current in the sensing coil to determine the distance between the coils.

13 Claims, 9 Drawing Sheets

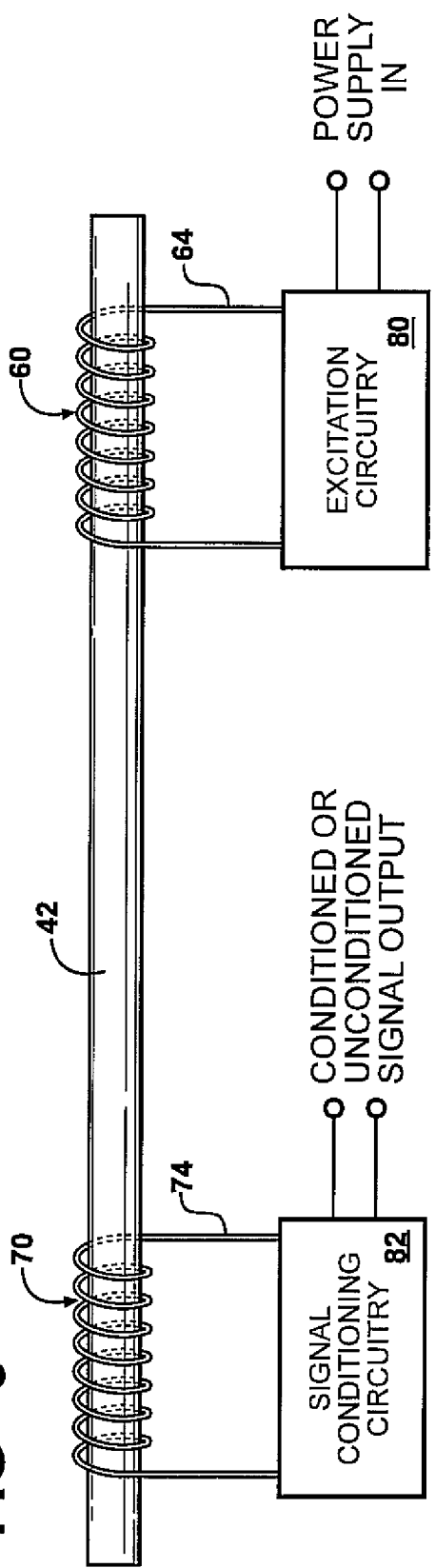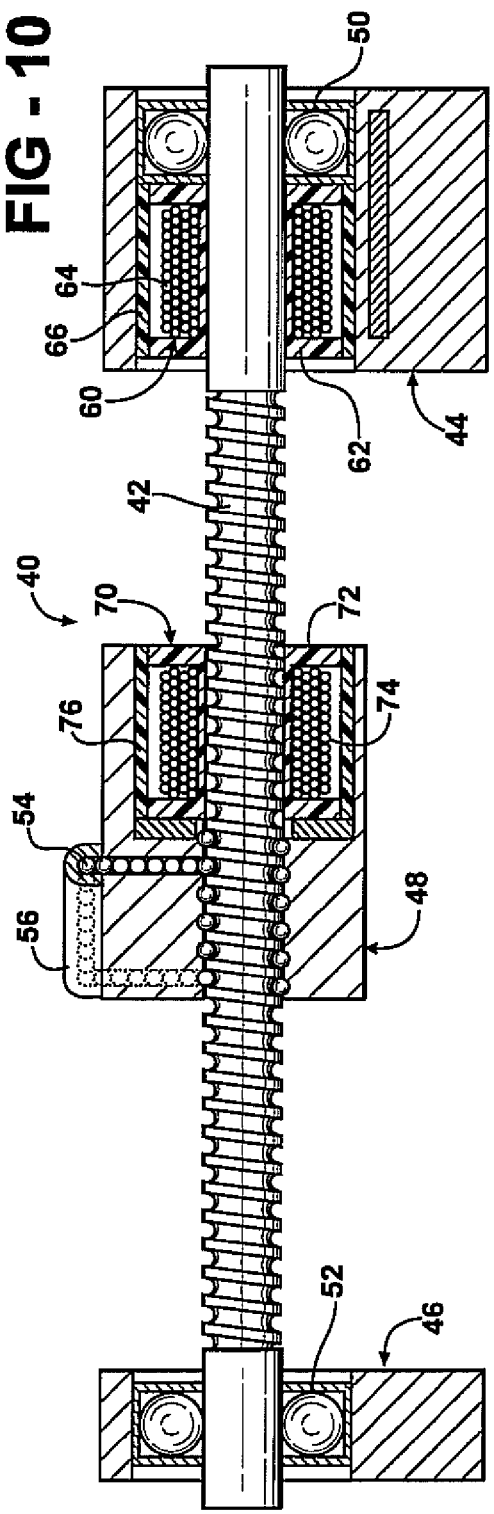

ACTUATORS AND MOVEABLE ELEMENTS WITH POSITION SENSING

REFERENCE TO RELATED APPLICATIONS

This applications claims priority to U.S. provisional patent application Ser. No. 60/732,583, filed Nov. 2, 2005, and U.S. provisional patent application Ser. No. 60/828,890, filed Oct. 10, 2006, both of which are incorporated herein in their entirety.

FIELD OF THE INVENTION

The present invention relates generally to position sensing, with embodiments of the present invention being directed to sensing the position of pistons within hydraulic or pneumatic actuators, position sensing of an element moveable along a shaft relative to the position of a generally stationary excitation coil, and to a control valve utilizing elements of the present invention.

BACKGROUND OF THE INVENTION

There are a broad number of applications where it is useful to be able to determine the position of one element relative to another element and/or the absolute position of a moveable element. As one example, hydraulic and pneumatic linear actuators typically include an elongated body with a drive rod or element that extends from and retracts into the body. It is often useful to know the position of this drive rod so as to control the position of a machine element attached to the drive rod. Various sensing systems are available for sensing the position of the drive rod. For example, a linear or rotary position sensor may be attached to the drive rod or an element attached to the drive rod. However, these sensors typically are external add-on systems with a variety of limitations. As such, there is a need for additional sensing systems and actuators incorporating such systems.

There are also a variety of other mechanical systems where position sensing is useful. As an example, a linear motion bearing may be moveable along an elongated rod or shaft and may support portions of a mechanical system. A measurement of the position of this linear bearing along the rod or shaft may be useful in determining the position of various elements, whether a system is within specifications, when to turn actuators and/or motors on or off, and for other reasons. Again, there are a number of sensing systems available for this use, but there remains a need for additional systems.

SUMMARY OF THE INVENTION

According to a first embodiment of the present invention, a hydraulic or pneumatic actuator includes an elongated sleeve having a longitudinal bore defined therethrough. A piston is disposed in the bore and moveable along the bore between a retracted and an extended position. In the extended position, a portion of the piston extends out of the sleeve. The piston includes at least a portion of magnetic material. A winding is disposed around at least a portion of the longitudinal bore. The winding has a pair of opposed ends. A piston position determining circuit is in communication with the winding and is operable to sense the position of the piston relative to the winding. In some versions, the piston position determining circuit is operable to energize the winding and to determine the current rise time or reactive voltage of the winding. The elongated sleeve may include an inner layer formed of a non-magnetic material. The inner layer has an outer surface and the winding may be disposed on the outer surface of the inner layer. The winding may be a wire wrapped around the outer surface of the inner layer or may be an electrical trace defined on the outer surface of the inner layer. In some versions, the inner layer is formed of a polymer, aluminum, stainless steel or brass. In further versions, a second winding is disposed about at least a portion of the longitudinal bore and an energizing circuit is operable to energize the second winding. In this version, the piston position determining circuit is a sensing circuit operable to sense a voltage or current in the first winding in response to the energizing of the second coil.

In some versions, the elongated sleeve is an inner sleeve with a pair of opposed ends. The actuator also includes a pair of end caps that close the ends of the inner sleeve. An outer sensor sleeve is provided and is disposed coaxially around the inner sleeve. The winding is disposed in or around the outer sensor sleeve.

The actuator may further include a hydraulic control valve operable to selectively supply hydraulic fluid to the bore on one side of the piston, thereby moving the piston. Alternatively, the actuator may have a pneumatic control valve operable to selectively supply pressurized gas to the bore on one side of the piston, thereby moving the piston.

In some versions, the winding extends substantially the entire length of the sleeve. The winding may include a plurality of turns in a single layer with each turn being adjacent or very close to the neighboring turn. In some versions, the piston is formed of a ferromagnetic material.

In a second embodiment of the present invention, a position sensing system is provided for a hydraulic or pneumatic actuator of the type having an elongated sleeve with a longitudinal bore defined therethrough and a piston disposed and moveable along the bore. The piston includes at least a portion of magnetic material. The sensing system includes a sensing sleeve having a receiving bore for receiving the actuator therein and a winding disposed around the receiving bore. A piston position determining circuit is in communication with the winding and is operable to sense the position of the piston relative to the winding.

The present invention also provides a method for determining the position of the piston in a hydraulic or pneumatic actuator. The method includes providing a hydraulic or pneumatic actuator having an elongated sleeve with a longitudinal bore defined therethrough and a piston disposed in and moveable along the bore. The piston includes at least a portion of magnetic material. A sensing system is provided including a sensing sleeve having a receiving bore and a winding disposed around the receiving bore. The actuator is disposed in the receiving bore of the sensing sleeve and the winding is energized. The inductance of the winding is sensed so as to determine the position of the piston relative to the winding. The method may also include correlating the winding inductance with the piston position and the inductance sensing step may comprise sensing the current rise time or reactive voltage of the winding.

According to a further embodiment of the present invention, a position sensing system is provided for a mechanical apparatus having an elongated guide member and an element moveable along the guide member. The guide member is at least partially formed of magnetic material. The sensing system includes an excitation coil disposed adjacent the guide member and a sensing coil disposed adjacent the guide member and moveable with a moveable element relative to the excitation coil. An excitation circuit is operable to energize the excitation coil and a position sensing circuit is operable to sense a voltage or a current in the sensing coil in response to the energizing of the excitation coil. The voltage or current in the sensing coil is related to the distance between the excitation coil and the sensing coil. In some versions, the excitation and sensing coils each surround the guide member. The coils may be supported on bobbins formed with a non-magnetic material and the excitation circuit may energize the excitation coil with a series of electrical pulses.

In a further embodiment of the present invention, a mechanical apparatus and piston sensing system is provided which includes an elongated guide member at least partially formed out of a magnetic material. An element is moveable along the guide member. A sensing system includes an excitation coil disposed adjacent the guide member and a sensing coil disposed adjacent the guide member and moveable with the moveable element relative to the excitation coil. An excitation circuit is operable to energize the excitation coil and a position sensing circuit is operable to sense a voltage or current in the sensing coil in response to the energizing of the excitation coil. The voltage or current in the sensing coil is related to the distance between the excitation coil and the sensing coil. In some versions, the guide member is a shaft formed of ferromagnetic material. The excitation coil and the sensing coil may each surround the guide member and the coils may be supported on bobbins formed of the non-magnetic material.

The present invention further provides a method of determining the positioning of a moveable element of a mechanical apparatus. The method includes the steps of providing an elongated guide member at least partially formed of a magnetic material and an element moveable along the guide member. A sensing system is provided that includes an excitation coil disposed adjacent the guide member and a sensing coil disposed adjacent the guide member and moveable with the moveable element relative to the excitation coil. The method further includes the steps of energizing the excitation coil and sensing the voltage or current in the sensing coil in response to the energizing of the excitation coil.

The present invention also provides a unified hydraulic control valve that includes a block of ferromagnetic material having a valve receiving bore defined therein. The valve also has a coil receiving bore defined therein. A valve is received in the valve receiving bore and an actuator coil is disposed in the coil receiving bore. A portion of the valve is received in the coil. A combination flux plate and coil drive circuit is mounted to the block such that the circuit makes direct connection with the coil.

BRIEF DESCRIPTION OF THE DRAWINGS

FIG. 9 is a diagram of elements of a sensing system according to the present invention;

FIG. 10 is a cross-sectional view of the lead screw and sensing system of FIG. 5, taken along the lines 10-10;

DETAILED DESCRIPTION OF THE INVENTION

Figure 1:
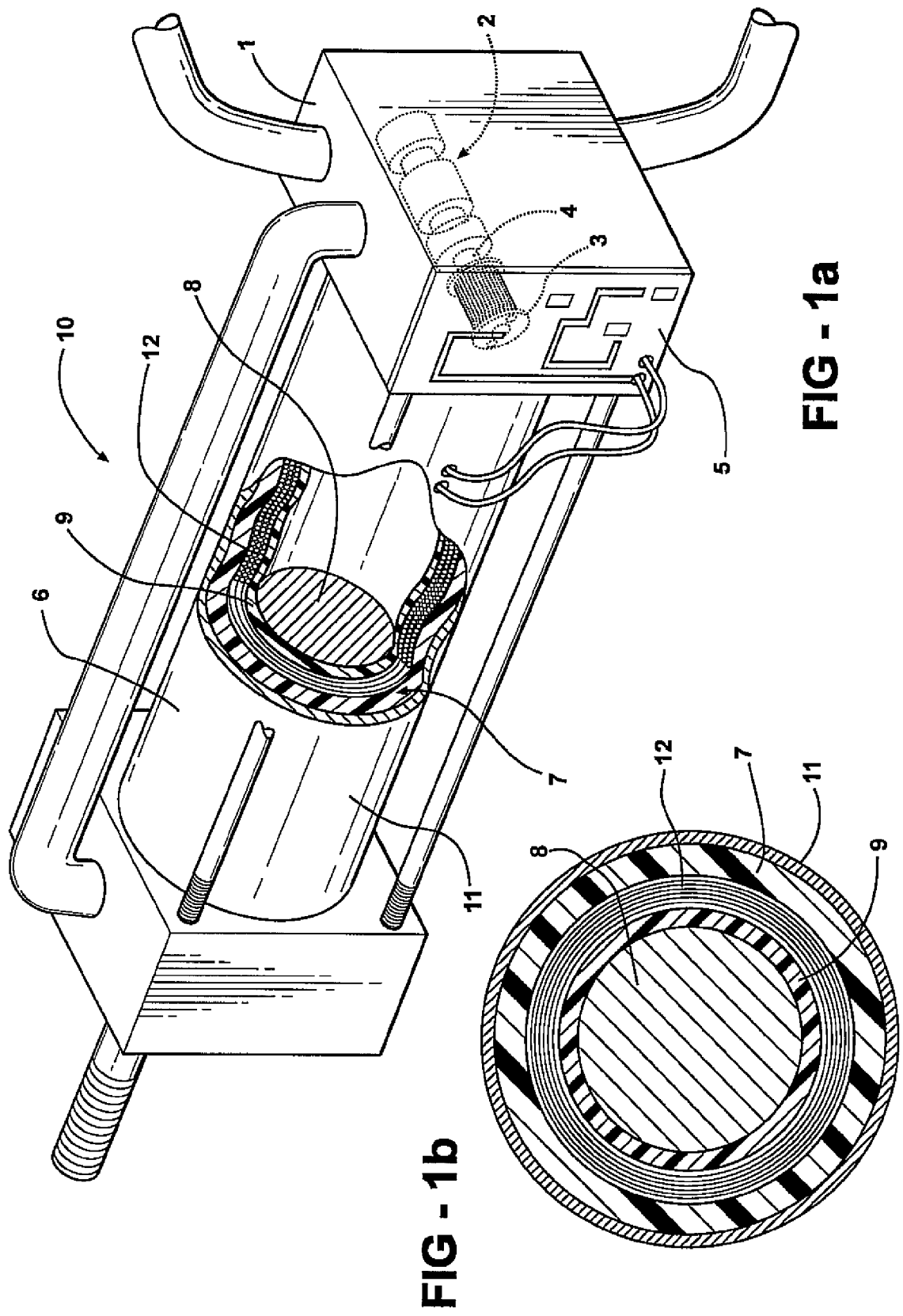
FIG. 1A is a perspective view of a partially cutaway hydraulic actuator, including an embodiment of a piston position sensing system according to the present invention.
FIG. 1B is a cross-sectional view of the actuator of FIG. 1A.

FIG. 1 illustrates a hydraulic or pneumatic actuator 10 according to an embodiment of the present invention. The basic design of hydraulic and pneumatic actuators is well known, and therefore only the portions of the present invention which differ from common practice will be described. Additionally, the present invention may be utilized with actuators having different configurations than that shown at 10. The actuator 10 has an end block 1 that is preferably a block of ferromagnetic or magnetic material. The block 1 has a series of machined holes and slots defined therein to provide a typical hydraulic/pneumatic flow control valve. A hydraulic spool valve 2 is positioned in this hydraulic circuit and moves so as to direct hydraulic or pneumatic fluid to different portions of the actuator 10, thereby controlling its output. One end of the spool valve 2 is either connected to or forms the piston of an electromagnetic actuator 4, which is preferably a solenoid. The solenoid has an outer coil on a bobbin 3 which is positioned in a bore in the block 1. A combination flux plate and coil drive circuit 5 is mounted to one end of the block 1. This combination plate and drive circuit closes the flux path around the bobbin and also provides circuits that are directly interconnected to the coil, without interconnecting wires. As discussed in Applicant's U.S. Pat. No. 6,888,052, the entire contents of which is incorporated herein by reference, direct connection of the circuitry to the coil wire provides significant advantages. In addition, the positioning of the coil bobbin in a block of magnetic material provides significant advantages, as discussed in the co-pending application.

According to a further aspect of the present invention, the hydraulic cylinder 6 has an outer sleeve 7 that includes a coil or winding for sensing the position of a piston 8 in the sleeve. FIG. 1b shows a cross sectional view of the sleeve 7 and piston 8. As known to those of skill in the art, a sleeve for a hydraulic cylinder may have one or more layers, such as a liner layer, a reinforcement layer, and an outer protective coating or layer. The sleeve 7 in FIGS. 1a and 1b is illustrated as having an inner liner layer 9 and an outer protective layer 11. According to the present invention, the liner layer is formed of a non-magnetic material, such as brass, some types of non-magnetic stainless steel, phenolic or plastic. A coil or winding 12 is wrapped about the liner layer 9. The winding consists of a wire that forms a coil with a pair of ends, not shown.

The piston 8 is movable along the bore in the sleeve and has a portion that extends out of the sleeve when the piston is in an extended position. In FIG. 1a, the portion that extends outside of the sleeve is rod shaped and has a smaller diameter than the portion inside the sleeve. Alternatively, both portions may have the same cross section. When a piece of magnetic material, such as piston 8, is moved such that the amount of magnetic material inside a coil, such as winding 12, varies, the change in position of the magnetic material within the coil causes an inductance change. According to the present invention, this effect can be used to determine the position of the piston 8 within the sleeve 7. The piston may be formed partially or completely of a magnetic material, or may have a magnetic "marker" added to it. For example, the piston may be formed of a non-magnetic material, such as plastic or aluminum, and have a coating, attachment, or inclusion of magnetic material. Alternatively, the rod portion of the piston that extends and retracts from the sleeve may be formed at least partially from a magnetic material while the part that seals to the inner bore of the sleeve is not.

Figure 3:
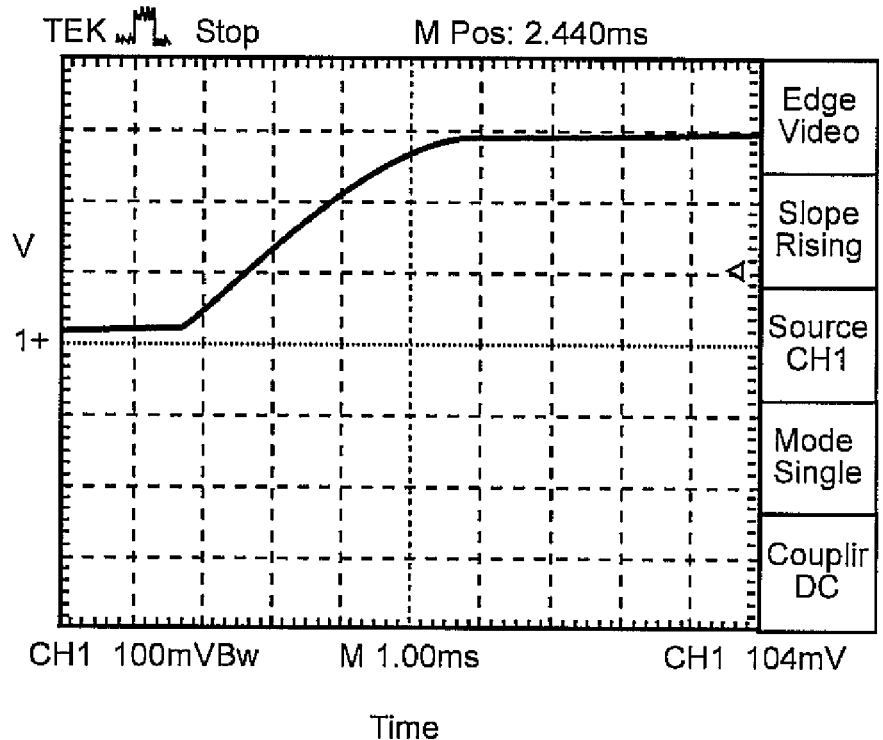
FIG. 3 is an exemplary chart of current rise time for a sensing coil with a piston in a first position.
Figure 4:
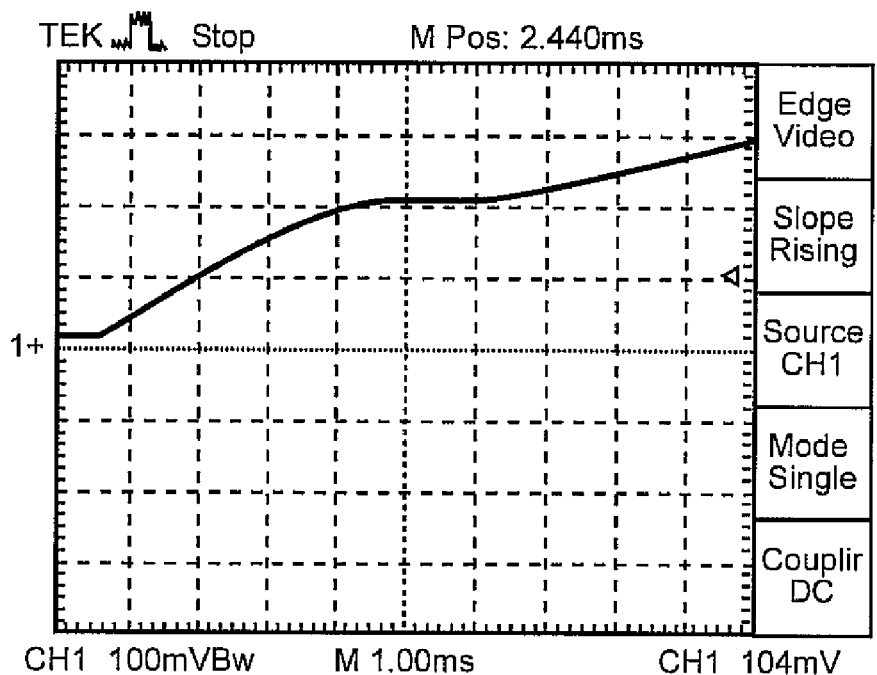
FIG. 4 is an exemplary chart of current rise time in a sensing coil with the piston in a second position.

One approach to determining the position of the piston involves measuring the current rise time of the coil 12 when it is energized. The current rise time will vary depending on the position of the piston 8 relative to the coil 12, as well as other factors, such as temperature. Therefore, by monitoring the current rise time, the position of the piston relative to the coil may be determined without the use of an external sensor or other means. Most preferably, the piston position may be determined by monitoring the shape of the current rise time curve. The current rise time curve reflects the change in current draw versus time. FIGS. 3 and 4 are graphs showing current rise time for a coil for two positions of a piston within the coil. In FIG. 3, the current rise time curve is shown for a piston that is at one end of a coil. FIG. 4 shows the current rise time for the same coil with the piston away from the end of the coil. As may be easily seen, the current rise time curves are dramatically different for the two different positions. It should be noted that these particular current rise time curves are not the only curves that may be expected for coils. Instead, for each design and type of system, the current rise time versus position curves may be experimentally determined. Another approach to determining piston position is to measure the reactive voltage of the winding. Both reactive voltage and current rise time vary with inductance, which varies with the amount of magnetic material inside the coil.

The coil 12 may be energized in various ways. For example, a steady voltage may be applied to the ends of the windings such that current flows thru the winding in one direction. alternatively, an alternating voltage may be applied, such as a full or half sine or other wave. In this case, current may flow in one direction and then the other direction. A pulsed voltage wave, such as a pulse width modulated signal, may also be applied, and may be positive voltage only or alternating.

As mentioned previously, the current rise time curve also varies with temperature. Temperature may be determined either by direct sensing, such as by the use of RTD, or may be modeled. For example, the temperature may be modeled by monitoring the electrical on-time of the coil and modeling its effects.

The piston position can be correlated with current rise time or reactive voltage so as to accurately provide piston position. Inductance can also be determined in other ways. The coil 12 in the sleeve 7 may cover only a portion of the liner 9, may cover the entire liner, or more than one coil may be provided to improve position sensing. In preferred embodiments of the present invention, a piston position sensing circuit is provided which is in communication with the winding and is operable to sense the position of the piston using the winding. The circuit may be wired directly to the winding and measure inductance directly. It may also form part of the circuitry operable to energize the winding. The position sensing circuit may include temperature compensation capability and may include a look up table or model to compensate for the temperature of the sensed device and winding.

Figure 11:
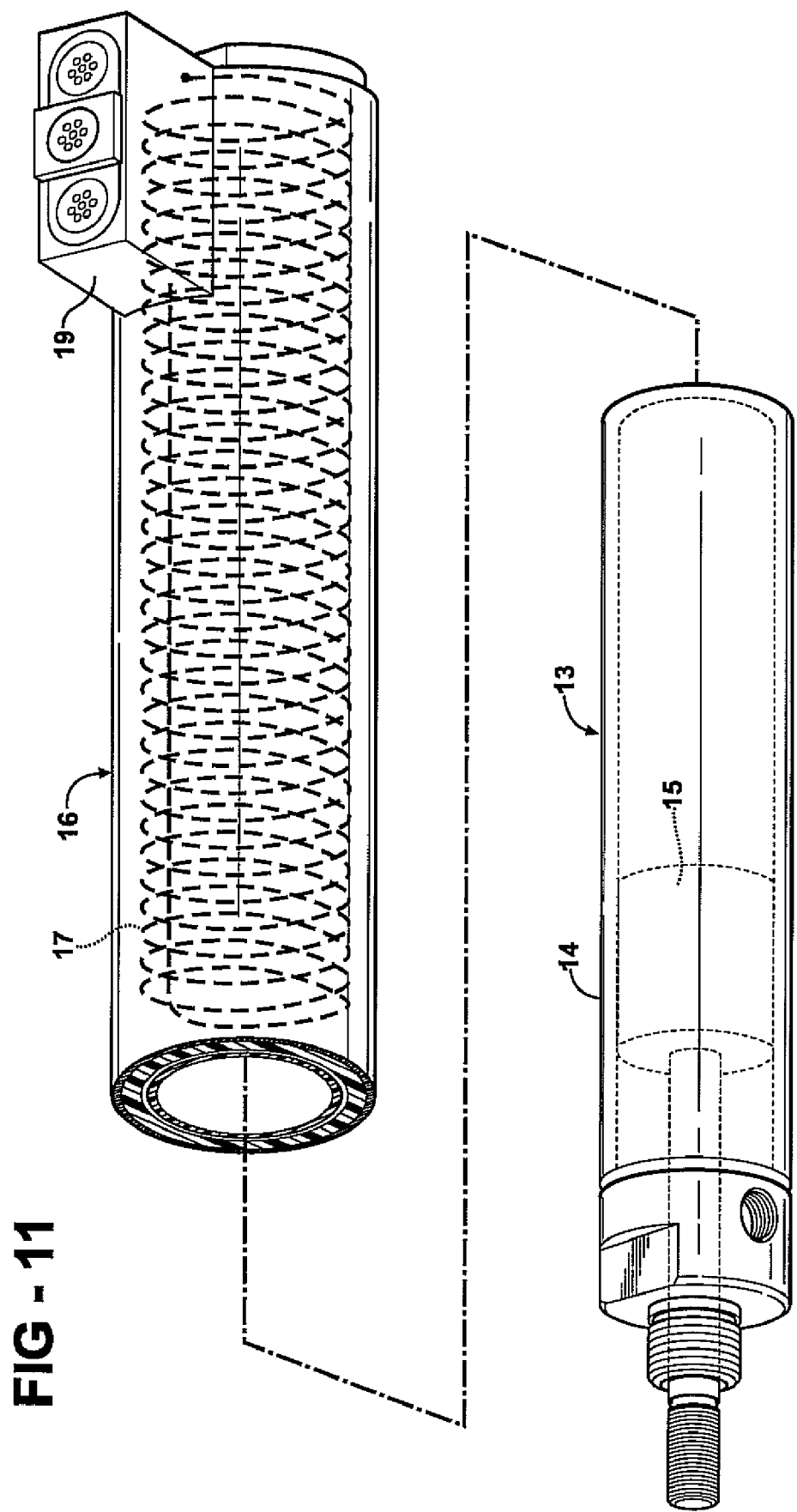
FIG. 11 is a perspective view of a hydraulic or pneumatic actuator along with an auxiliary sensing system that receives the actuator.

In an alternative version of the present invention, shown in FIG. 11, the sensing coil is external to the hydraulic or pneumatic actuator itself. In one embodiment, an actuator 13 has a sleeve 14 with a bore defined therein and a piston 15 movable along the bore. The piston has a portion that extends and retracts from the sleeve and includes at least a portion of magnetic material. An auxiliary sensing sleeve 16 is provided which fits over the actuator sleeve. The sensing sleeve includes a winding 17 that surrounds the actuator sleeve when installed. In the illustrated embodiment, the sleeve 16 includes an inner layer and the winding 17 is wrapped around the inner layer. An excitation and sensing circuit or module 19 is preferably also provided. The winding in the sensing sleeve interacts with the piston and by energizing the winding, the position of the piston in the actuator can be determined. Calibration is preferably performed after the sensing sleeve is installed. While the winding 17 is illustrated as having spaced apart turns, it is preferred that the winding be a single layer of turns with each turn being adjacent to neighboring turns.

In an alternative embodiment, the sensing sleeve is formed as a plurality of short tubes that can be joined end to end to form the entire sleeve. Preferably, each short tube has interconnects allowing the multiple sleeves to be physically and electrically interconnected so as to form a generally continuous sleeve and a generally continuous winding. A jumper may be provided at the end to complete the winding, or the jumper may be part of an end tube. In another alternative, two or more sleeves are telescopically received in one another and may be slid apart to provide the necessary length to cover the actuator. The telescoping sleeves may be electrically interconnected in a variety of ways. The circuitry forming part of the overall sensing device may include calibration functions to adjust for the use of multiple short tubes and/or telescoping sleeves.

The above-discussed aspects of the present invention provide numerous advantages. In some embodiments where the valve is part of the end block, machining and assembly costs are reduced, and the overall size of the system may be reduced. As discussed in Applicant's patent, the ferromagnetic block improves the flux path around the solenoid 4, thereby improving electromechanical efficiency and speed, as compared to typical solenoids. Also as discussed in Applicant's patent, the direct connection of the drive circuitry with the coil provides electrical advantages. The configuration of the spool valve and the drive circuitry allow easier position sensing of the spool valve using the above disclosed methods. In other embodiments, the piston sensing provided by the winding 12 in the sleeve 7 is simpler and has numerous advantages over traditional position sensing.

According to a further aspect of the present invention, a winding or coil may be provided for position sensing in a number of ways. In one preferred approach, the non-magnetic liner or inner layer 9 or 18 is provided and a coil of wire is wound about the liner using standard coil winding techniques. The wires can be round, square, ribbon or other shapes. The coil may be a single layer or multiple layers. Another approach according to the present invention is to provide a liner or inner layer formed of a non-conductive material, such as plastic, or a liner covered with a non-conductive material. A "resist" emulsion may then be printed or applied to the liner in a spiral pattern. The liner is then plated so as to form the windings. One version uses a plastic that can be plated. Alternatively, the liner or inner layer may be etched in a spiral pattern with the etching then filled with a conductive material, or an etching process may be accomplished via the typical printed circuit board techniques.

A further approach according to the present invention is to print, paint or otherwise apply a conductive material onto the liner or inner layer in a spiral pattern in order to form the coil windings.

Yet a further approach according to the present invention is to form a liner or inner layer out of a plastic with a coil wire embedded therein. A coil wire embedded in a liner or inner layer may be accomplished in a variety of ways. As one example, the coil may be formed in a mold with plastic then being injection or otherwise molded around the coil. Alternatively, the liner or inner layer may be formed out of a meltable plastic with the coil being heated and "sunk" into the liner or inner layer. Other approaches will be clear to those of skill in the art.

As a further alternative, the coil or winding may be formed on the inner surface of some portion of the sleeve, such as being formed on the inner surface of the reinforcement layer, such that it is outside the liner or inner layer. Other approaches may also be used as long as the winding or coil surrounds the bore in which the piston moves. This can be accomplished in a number of ways other than those illustrated.

As will be clear to those of skill in the art, embodiments in the present invention may have a variety of sizes, shapes, etc. In one working example of the present invention, the piston 8 has a diameter of approximately 1.5 inches and is formed of steel. The sleeve 7 has a length of about 6 inches, with the piston being movable along substantially the entire length. The liner layer 9 has an inner diameter slightly larger than the piston and a wall thickness of approximately 0.015 inches. The liner layer in this example is formed of plastic. The coil or winding 12 is a single layer of copper 28 gage wire and is wrapped around the liner layer a total of 350 turns. The coil covers or partially covers the liner layer along most or all of its length. The individual turns of wire may be spaced apart from one another along the length of the liner or may be closely packed. In a preferred embodiment, the turns are in a single layer with each turn adjacent or very close to a neighboring turn. In this embodiment, the piston is always inside the winding, even when it is at the extreme end of its travel. Alternatively, the coil may not extend the entire length of the liner. For experimental purposes, the coil was attached to an oscilloscope and energized using a pulse width modulated voltage wave. The above embodiment has a position resolution of approximately 0.008 inches.

As will be clear to those of skill in the art, when the coil is energized, an electromagnetic force will be exerted on the piston. In most embodiments of the present invention, the electromagnetic force will be very small compared to the hydraulic or pneumatic force exerted on the piston by the actuator system. As such, the energizing of the coil should have little or no effect on the position or movement of the piston. In other embodiments, the coil may be used to alter the position or motion of the piston, as well as sense a position. For example, the coil may be energized in order to move the piston with the current rise time or reactive voltage indicating the position of the piston.

In an alternative embodiment of the present invention, a first coil and a second coil both surround the bore in the actuator sleeve, either integrated with the actuator as in FIG. 1a or in an auxiliary sleeve as in FIG. 11. Preferably, the second winding surrounds the first winding and both extend a similar length. Both may be a single layer winding, or either or both may have more than one layer. One of the coils is then energized, and the voltage or current in the other coil is sensed in response to the excitation. The piston position can then be inferred from the sensed voltage or current. A sensing circuit and an excitation circuit are preferably provided, and may be part of the same circuit.

The actuator 10 in FIG. 1a is a hydraulic actuator and includes other elements typical for such an actuator. For example, hydraulic fluid is provided through a control valve to one or both sides of the piston to adjust its position, and seals are provided to resist leaks. A pneumatic actuator similar to the actuator 10 may also be provided.

Figure 2:
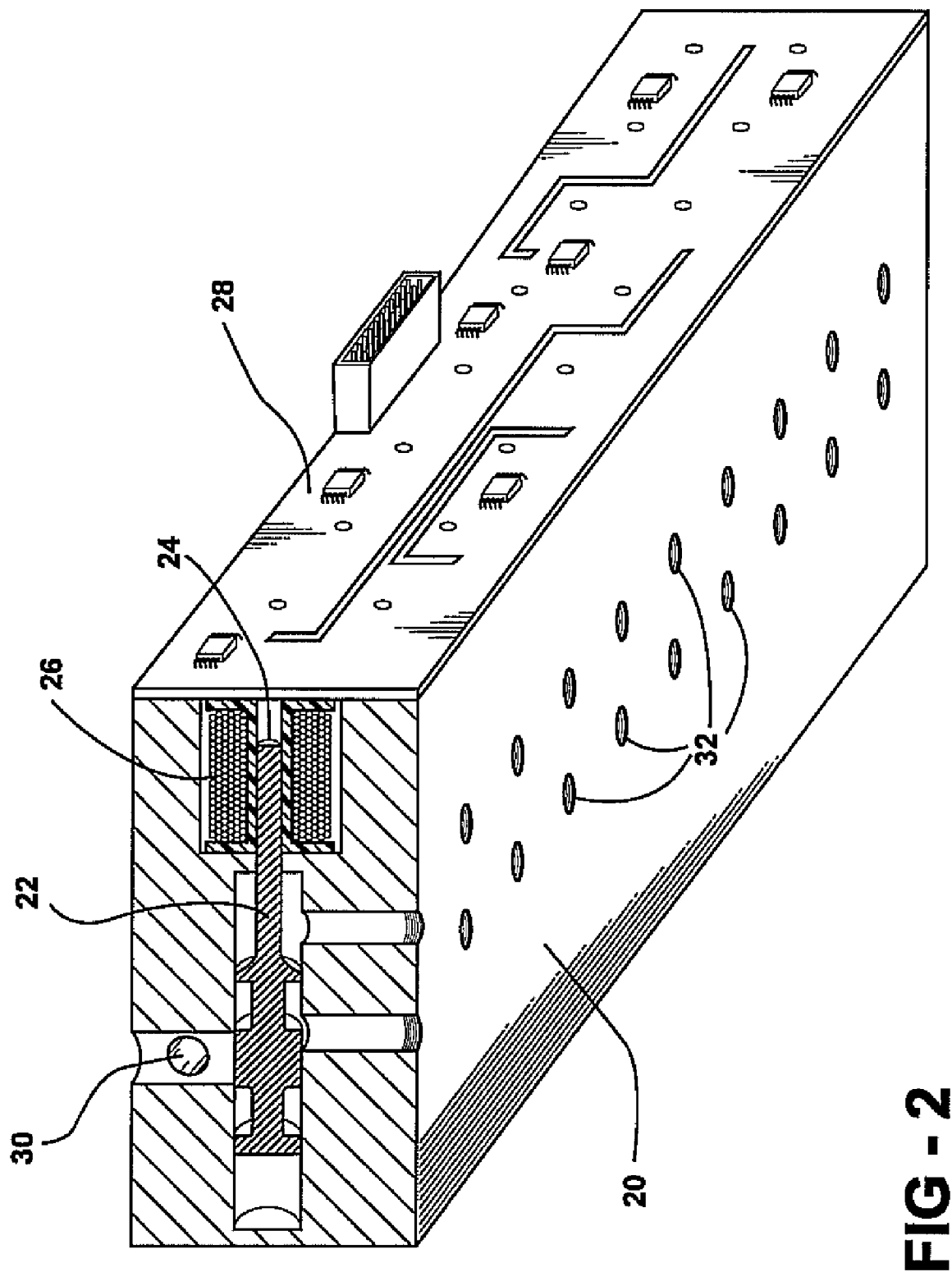
FIG. 2 is a perspective view of a unified hydraulic manifold, with a portion cutaway, utilizing embodiments of the present invention.

Referring now to FIG. 2, a unified hydraulic manifold is illustrated. This aspect of the present invention provides a unified manifold, that combines the electrical drive circuits, the solenoid actuators, the flow control valves, and the input and output connections, all machined within a common piece of magnetic material, such as iron, for the control of multiple hydraulic actuators. A piece or block of magnetic material is shown at 20. It has a series of holes and slots machined therein to provide a plurality of hydraulic flow control valves therein. The block 20 is shown sectioned so as to illustrate one hydraulic spool valve 22 inside the manifold. As with the prior embodiment, the spool valve is either connected to or one end forms the piston 24 of an electromechanical actuator, such as a solenoid. The piston 24 is disposed inside of a coil bobbin 26 which is embedded in a bore in the block 20. A combination flux plate and coil drive circuit 28 is mounted to one side of the block 20. This combination closes the flux path for the coil 26, and provides direct interconnection of the circuitry with the coil. This provides the advantages discussed earlier, and in Applicant's patent.

When the drive circuitry 28 is instructed by an external control, a voltage is sent to coil 26 causing the piston 24 to move the valve 22. This directs hydraulic or pneumatic pressure from the intake manifold 30 to various output ports 32, thereby controlling the flow of hydraulic or pneumatic fluid.

As discussed above, the position of the solenoid pistons 24 in the coils may be determined by monitoring the current rise times or reactive voltages of the coil when energized.

According to a further aspect of the present invention, a method is provided for "soft starting" valves instead of the standard on/off spool valve. A shallow screw thread may be machined instead of the typical right angle slot found on a typical spool valve piston. Alternatively, a small slot can be machined into the sides of a typical right angle spool valve piston. As will be clear to those of skill in the art, this provides a soft start valve, which is beneficial in some applications. The invention of FIG. 2 provides advantages similar to the previously discussed embodiments of the present invention. The manifold reduces the total amount of machining and assembly costs as compared to multiple separate components. Electromechanical efficiencies and speeds are improved due to the flux path provided by the block, as compared to the typical tubular solenoid. Having the solenoid drive circuitry mounted directly on top of the coil bobbin aids electrical characteristics. Additionally, the position of the spool valve may be sensed more easily using the configuration shown, due to the internal positioning of the solenoid drive circuitry. In both single, and especially in multiple valve configurations, overall space consumption is significantly reduced as compared to systems wherein various components were provided individually. In some applications, as much as a fifty percent space savings may be realized.

Figure 5:
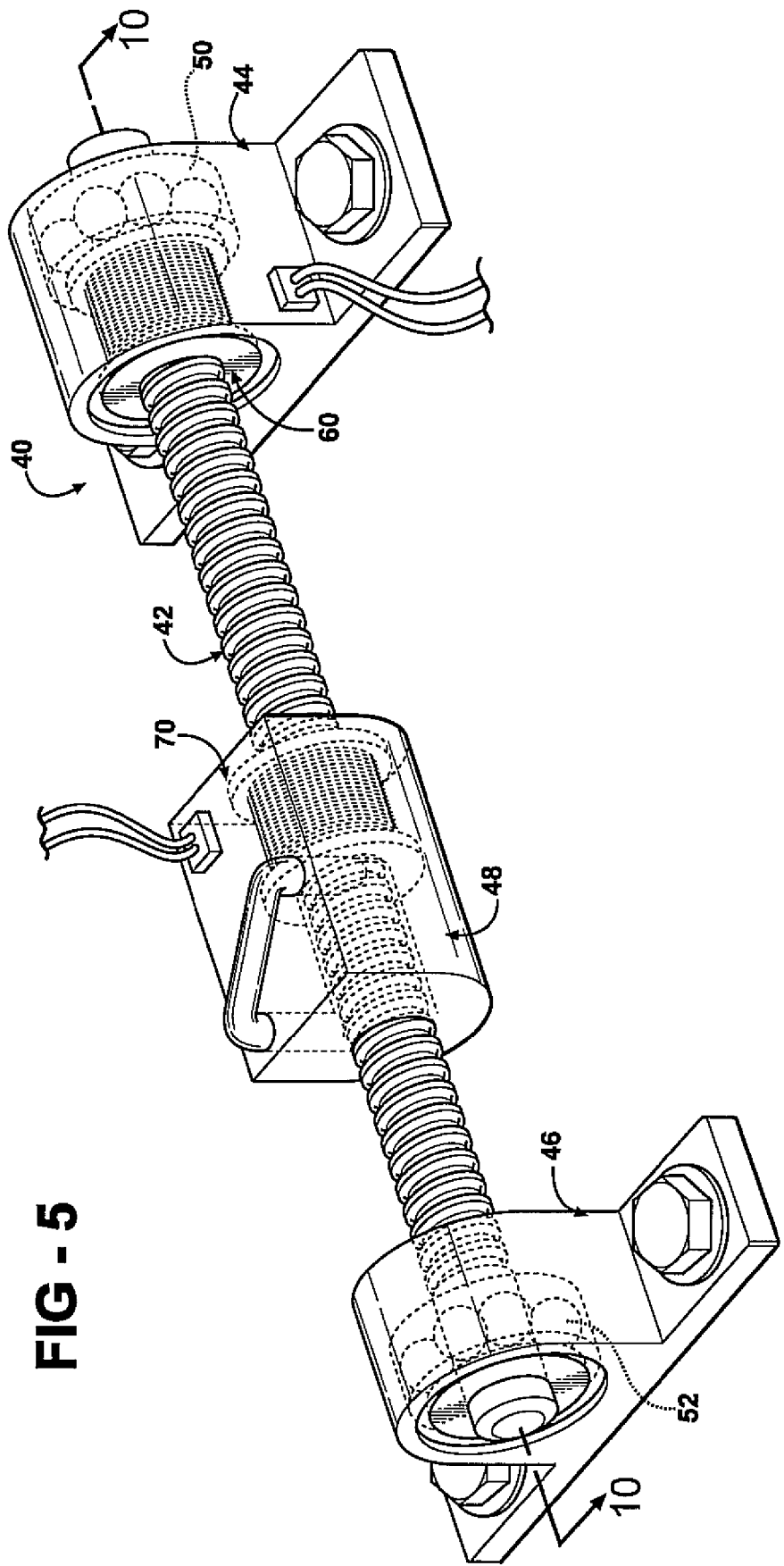
FIG. 5 is a perspective view of a lead screw type system with an embodiment of a sensing system according to the present invention incorporated therein.
Figure 6:
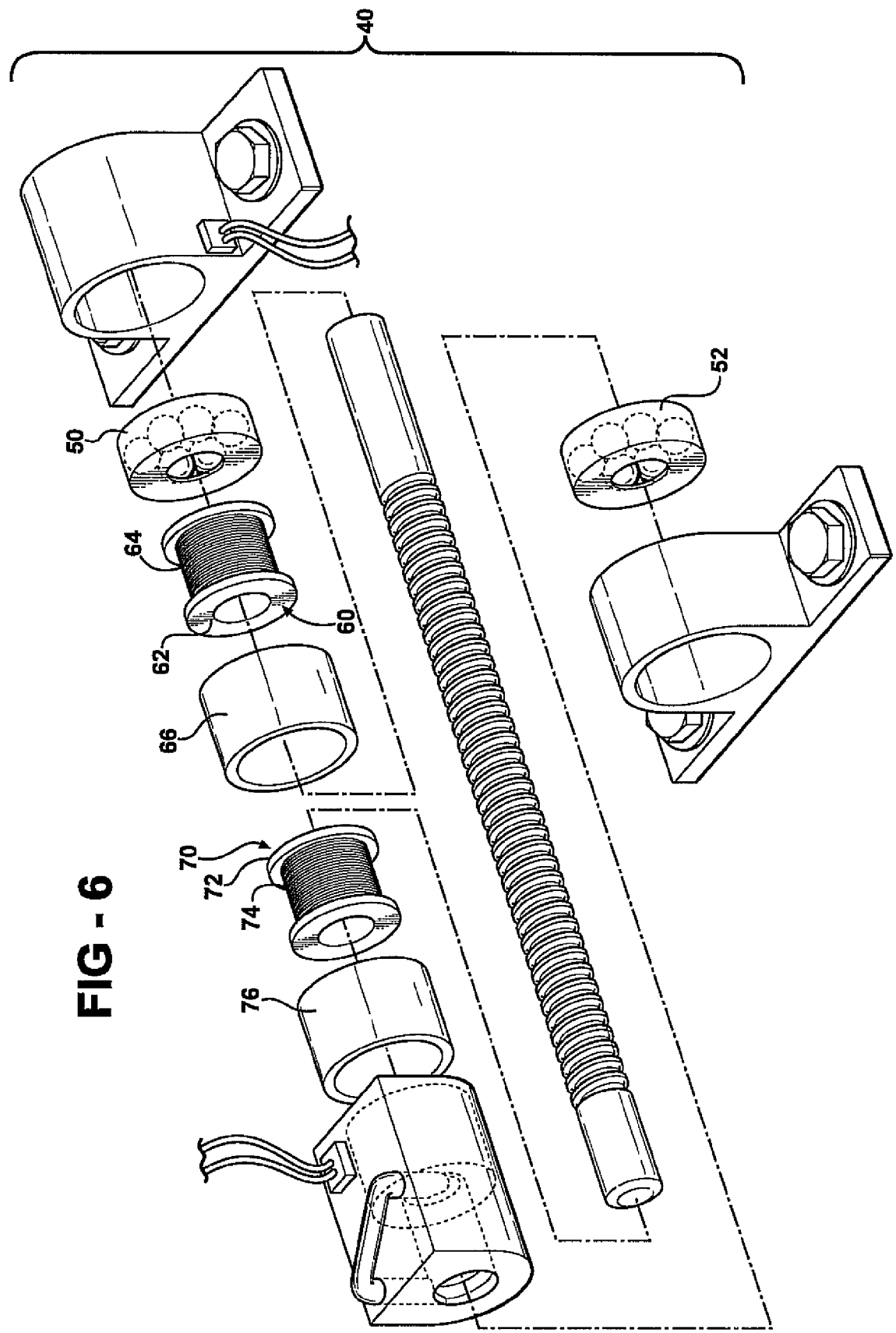
FIG. 6 is an exploded view of the lead screw and sensing system of FIG. 5.

Turning now to FIGS. 5, 6 and 10, another embodiment of a sensing system and mechanical system utilizing such a sensing system will be described. FIG. 5 provides a perspective view of an exemplary lead screw system 40, including an elongated lead screw shaft 42 supported by a pair of bearing blocks 44 and 46. The shaft is preferably formed of a magnetic material, such as iron. An exemplary lead screw nut 48 is disposed on the shaft 42 and moveable along the shaft in response to rotational movement of the shaft 42 relative to the nut 48. FIG. 6 provides an exploded view of the components of the lead screw system 40, while FIG. 10 provides a cross-sectional view of the system 40 taken along lines 10-10 of FIG. 5. In this example, the bearing blocks 44 and 46 each include a ball bearing, 50 and 52 respectively, that support the shaft 42 for rotation about its longitudinal axis. In the illustrated embodiment, the bearings 50 and 52 support the shaft 42 adjacent its opposed ends. This is merely exemplary, and the bearings may be positioned or configured differently, the shaft may be larger or smaller and the bearing blocks may take other forms. A mid-portion of the shaft 42 is threaded in a form typical for lead screws for use with ball nuts. The lead screw nut 48 in this embodiment is of the type known as a ball screw nut that includes a plurality of balls 54 that rollingly engage the threads of the shaft 42 and recirculate through a circulation passage 56. As known to those of skill in the art, this creates a low friction, easily driven actuator. A sensing system according to the present invention may be used with the ball screw type actuator as shown, or other rotation or linear actuators. For example, the sensing system may be used with a ball screw drive wherein the nut remains in one location but the threaded shaft extends and retracts relative to the housing.

An excitation coil 60 is disposed around the shaft 42. In this embodiment, the excitation coil 60 is near one end of the shaft 42 and is supported by the bearing block 44. In the illustrated embodiment, the excitation coil 60 includes a bobbin 62 formed of a non-magnetic insulator material and an elongated wire 64 that is wrapped about the bobbin so as to form a winding or coil 64. It is preferred that the bobbin 62 be formed of a non-magnetic material, such as plastic, some stainless steels, or brass. Preferably, a non-magnetic insulating sleeve 66 is disposed around the bobbin 62 so as to enclose the winding 64 and separate them from the remainder of the supporting bearing block 44. In this embodiment, the bearing block 44 is formed of a metal, but could alternatively be made of a non-magnetic insulating material, thereby reducing or eliminating the need for the sleeve 66. Alternatively, the sleeve 66 may be eliminated in other embodiments, though its presence is preferred.

A sensing coil is also disposed around the shaft 42, but is moveable with the ball nut 48. In this embodiment, the sensing coil 70 is supported by and enclosed by a portion of the ball screw nut and is therefore fixed relative to the nut. The sensing coil 70 includes a bobbin 72 formed of a non-magnetic insulating material, an elongated wire wrapped around the bobbin so as to form a winding 74, and an enclosing non-magnetic insulating sleeve 76. Again, if the ball nut is formed of a non-magnetic insulating material, the sleeve 76 and/or bobbin 72 may not be necessary.

As shown, the position of the sensing coil 70 relative to the excitation coil 60 depends on the position of the nut 48 relative to the bearing block 40. In use, the excitation coil 60 is energized by energizing the winding 64. A voltage or current is then created in the sensing coil thru mutual inductance. As such, the position of the sensing coil 70 may be determined by sensing a voltage in the winding 74. FIG. 9 diagrammatically illustrates the electrical configuration of the system. The excitation coil 60 is represented by a limited number of wire loops surrounding a shaft 42 with the ends of the wire 64 being connected to excitation circuitry 80. The excitation circuitry 80 may be in turn connected to a power supply. As known to those of skill in the art, the excitation circuitry may be operable to apply any of a variety of direct or alternating voltages to the coil or winding 60. The sensing coil 70 is represented by a separate set of wire loops around the shaft 42 spaced from the excitation coil 60. The ends of the coil 70 are attached to signal conditioning circuitry 82 which is operable to sense a voltage or current in the coil 70 and output a conditioned or unconditioned signal. The output of the signal conditioning circuit may be representative of the position of the sensing coil 70 relative to the excitation coil 60. For example, as the distance between the coils 60 and 70 increases, the voltage or current in coil 70 will be reduced for a given excitation level in coil 60. The signal conditioning circuitry 82 may merely clean up and/or output a voltage or current representative of position, or include circuitry operable to convert the signal into an actual position, such as in a linear dimension.

As will be clear to those of skill in the art, the signal sensed by the signal conditioning circuitry 82 will depend on a variety of factors, including the relative positions of the coil 60 and 70, the dimensions and materials of the shaft 42, the number of coils forming each winding 64 and 74, the wire used to form each winding, and environmental factors such as temperature and other factors. In a preferred embodiment of the present invention, a system is assembled with a moveable element, such as nut 48, and a rotationally supported shaft 42, excitation and sensing coils are installed, and measurements are taken at various positions of the nut so as to calibrate the signal conditioning circuitry. The system may also include environmental condition sensors, such as temperature sensors, and use a look-up table or model to adjust for changes in environmental conditions. Once calibrated, the system can give highly repeatable and accurate indications of position. The system may also include the ability to field calibrate. For example, the mechanical system utilizing the sensing system may be commanded to move a moveable element, such as ball nut 48, to the limits of its travel, such as where the nut 48 comes in contact with the bearing block 46. A measurement using the sensing coil may then be taken and the system calibrated by setting this sensed measurement to the known position of the nut 48 when it contacts the bearing block 46.

Figure 12:
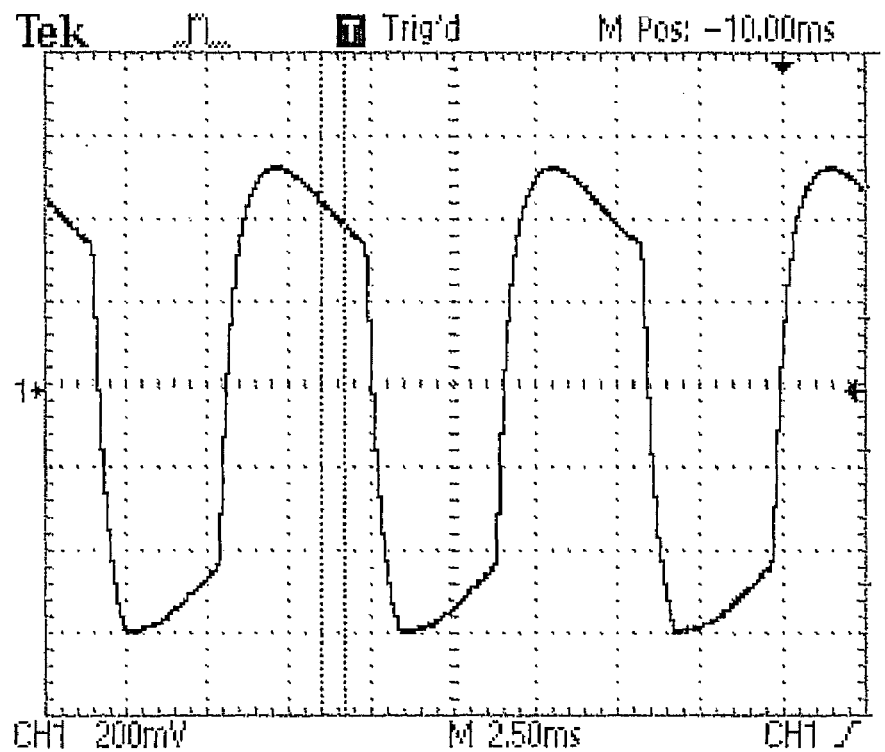
FIG. 12 is an exemplary chart of a waveform measured in a sensing coil in response to a waveform in an excitation coil in a system such as the embodiment of FIG. 5.
Figure 13:
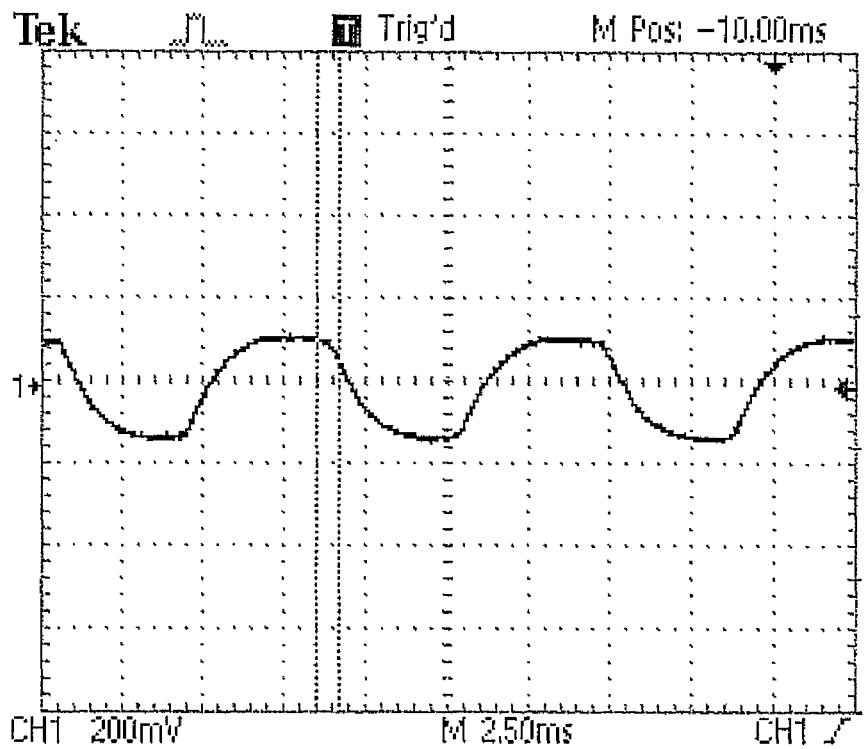
FIG. 13 is another exemplary chart similar to FIG. 12 but with the excitation coil and sensing coil separated by a greater distance.

As used herein, "excitation" of a coil may refer to applying a constant, non-constant or alternating waveform to the coil. The voltage of the waveform may be always positive of may alternate between positive and negative. A pulsed voltage wave, such as a pulse width modulated signal, may also be applied, and may be positive voltage only or alternating. FIGS. 12 and 13 provide exemplary charts of waveforms sensed in a sensing coil in response to a waveform in an excitation coil in a system such as the embodiment of FIG. 5. In this example, a sinusoidal voltage waveform has been applied to the excitation coil. FIG. 12 illustrates the response waveform in the sensing coil when it is close to the excitation coil and FIG. 13 illustrates the response waveform when the sensing coil is farther from the excitation coil. As an alternative approach, the distance between the excitation coil may be determined based on a time or phase lag between the excitation waveform and the response waveform.

Figure 7:
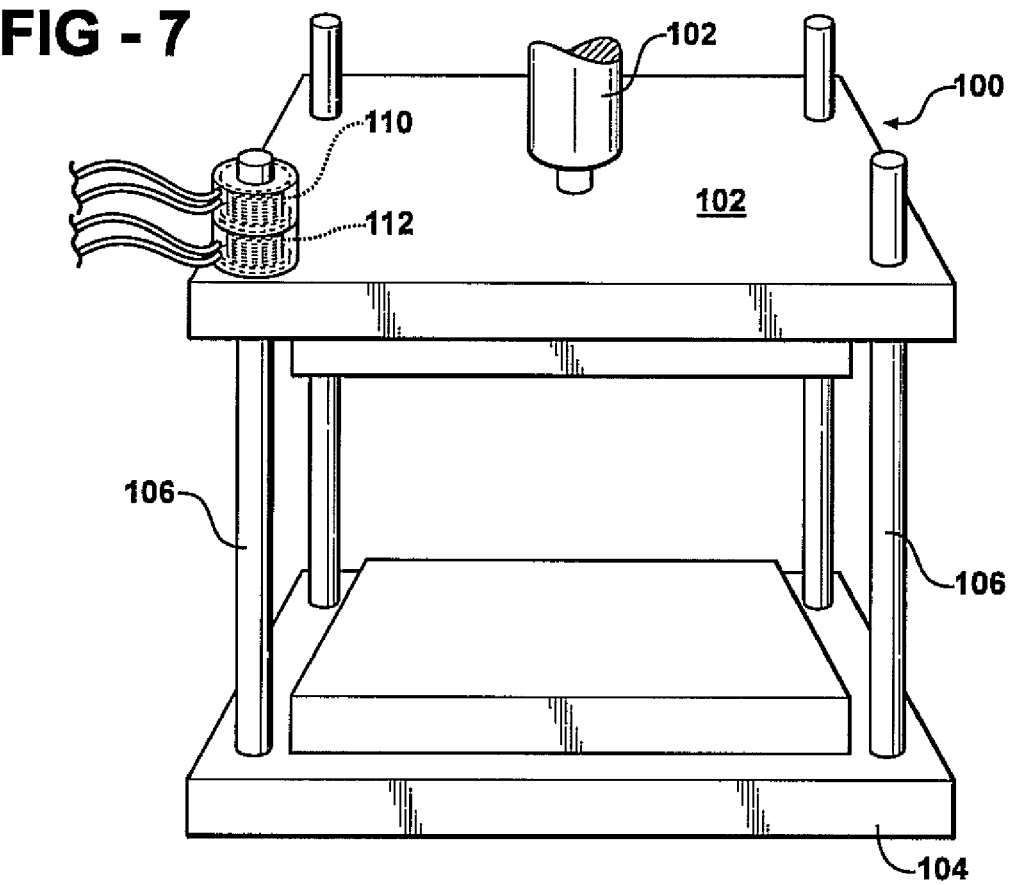
FIG. 7 is a perspective view of portions of an exemplary press incorporating a sensing system according to the present invention, with the upper portion of the press in a first position.
Figure 8:
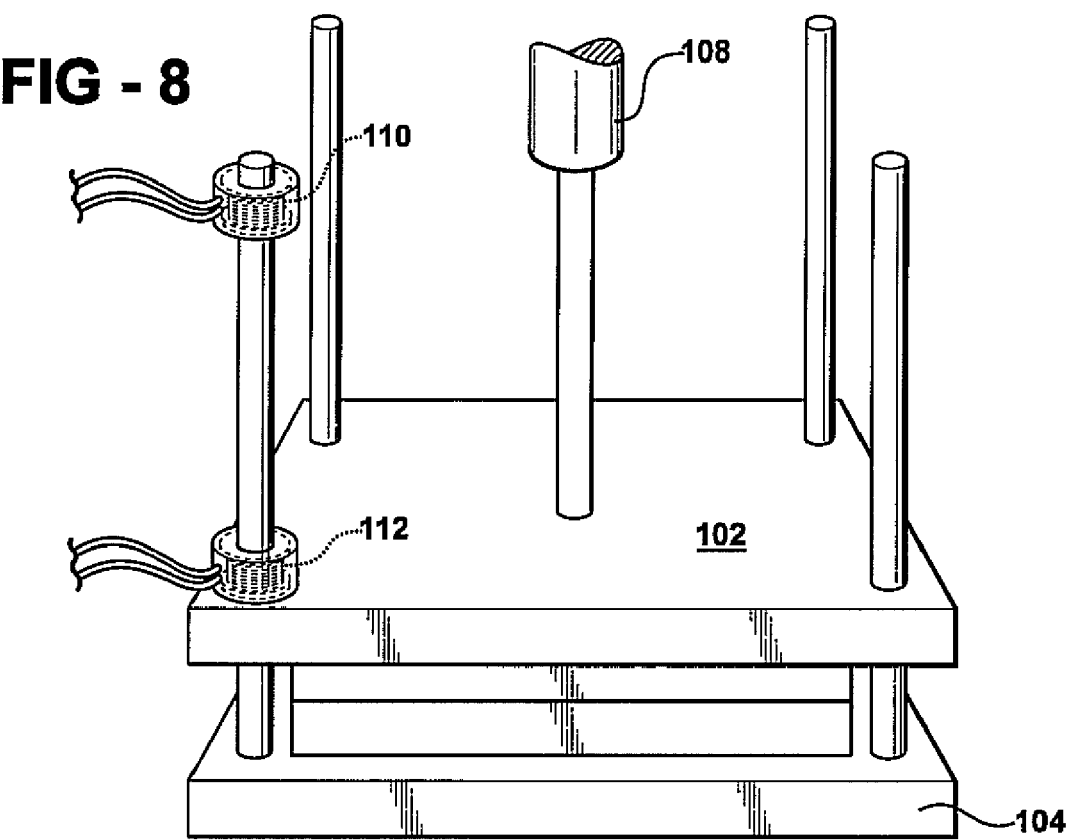
FIG. 8 is a perspective view of the press of FIG. 7 with the upper portion in a second position.

Referring now to FIGS. 7 and 8, another use for a sensing system according to the present invention will be described. An exemplary press 100 includes an upper portion 102 and a lower portion 104. The upper portion 102 is moveable relative to the lower portion 104 along a series of guide members 106. An actuator 108 is operable to move the upper element 102 relative to the lower element 104. In this embodiment, first excitation coil 110 is positioned on the upper end of one of the guides 106 while a second sensing coil 112 surrounds the same guide member 106, but is connected to the upper portion 102 for movement therewith. FIG. 7 illustrates the upper portion 102 at the upper end of its range of motion while FIG. 8 illustrates the upper portion 102 at the lower end of its range of motion. As shown, the coils 110 and 112 move from a position adjacent one another to a position where they are spaced apart. The position of the upper portion 102 may be determined by energizing the excitation coil 110 and sensing the responsive signal in the coil 112.

While it is preferred that the excitation and sensing coils of the present invention be used with an elongated member, such as a shaft, that is formed of a magnetic material, the present invention may also be modified for use with elongated elements formed of other materials, such as plastic. In one approach, an elongated shaft is formed of a plastic material, but a wire that is a magnetic material, such as iron, is embedded therein. Alternatively, a coating may be provided on the non-magnetic material so as to provide a path for the magnetism or inductance. The embodiments of the present invention utilizing an excitation coil and a sensing coil may also be used in combination with the embodiment having a coil surrounding a piece of magnetic material, such as shown in FIGS. 1A and 1B.

While the illustrated embodiments of FIGS. 5 and 7 show the coils surrounding a guide member, such as a shaft, the coils may alternatively be position adjacent the guide member without surrounding it. However, it is preferred that the coils each surround the same guide member. Embodiments of the present invention are not limited to the illustrated designs. The sensing system utilizing an excitation coil and a sensing coil may be used with or form part of any mechanical apparatus having a guide member to allow mutual inductance between the excitation coil and sensing coil. Either or both coils may be supported on movable members such that a distance between them may be changed. While one coil is illustrated as an excitation coil and the other as a sensing coil, the functions may be switched and/or more than one of either or both coils maybe provided. For example, a single excitation coil may be used with two or more sensing coils, such as with each sensing coil being mounted to a different movable member. Applications include actuators, machine tools, articulated mechanisms and other systems that include a component that will serve as a guide member.

Components of the present invention have been described herein as being formed partially or completely from a magnetic material. As used herein, a magnetic material is one that has a high enough magnetic permeability to function in the various embodiments of the present invention. Exemplary materials include iron and ferromagnetic materials, as known to those of skill in the art. Alloys and composites with sufficient magnetic permeability may also be used. While many types of stainless steel are considered non-magnetic, other types may be magnetic or be processed so as to have sufficient permeability to function in the present invention. For example, some austenitic grades of stainless steel have very low magnetic permeability but develop higher permeability after being cold worked. Other components are described herein as being non-magnetic and/or insulator materials. Such materials include phenolic, polymer plastics, glass, and many other materials known to those of skill in the art.

While the illustrated embodiments of the present invention sense the linear motion of one element along or within a linear bore or shaft, embodiments from the present invention may also be useful with non-linear or curved elongated elements.

Further embodiments of the present invention make use of elongated members with permeability that varies along its length. For example, a system such as shown in FIG. 7 may have an elongated member formed of a ferromagnetic material but wherein the cross sectional width of the member changes along its length, such as by being tapered or stepped. Use of such a member changes the response of the sensing coil depending on the distance from the excitation coil and also on the permeability of the member. As such, additional resolution may be obtained and/or the position of both coils relative to the member may be sensed or inferred. The permeability of the elongated member may be varied in different ways. For example, the permeability of some materials, such as some types of austenitic stainless steel, depends on processing. The processing of the member may be varied along its length, such as by shot blasting the member to different degrees along its length. The variation in permeability may be continuous, such as linear, or may fluctuate or be stepped, such as increased near the limits of travel or at a critical position. The permeability may also be varied by having a member that is filled or coated with materials of different permeability along its length. A hollow member could have different materials stacked inside, or have a tapered bore. A molded member could have varying amounts of material included along its length. The use of variable permeability may also be applied to embodiments of the present invention such as shown in FIGS. 1 and 11. For example, the shaft of the actuator may have variable permeability along its length. In one version, the shaft is hollow and filled with material to vary its permeability along the length. In another, the shaft has a tapered bore, or is processed differently along its length. This may be used in addition to or in place of sensing piston position, and would allow the use of non-magnetic pistons.

As will be clear to those of skill in the art, the various aspects of the present invention may be altered without departing from the scope or teaching of the present invention. It is the following claims, including all equivalents, that define the scope of the invention.

I claim:

1. A hydraulic or pneumatic actuator comprising:
   an elongated sleeve having a longitudinal bore defined therethru;
   a piston disposed in the bore and movable along the bore between a retracted position and an extended position, a portion of the piston extending from the sleeve in the extended position, the piston including at least a portion of magnetic material;
   a winding disposed around at least a portion of the longitudinal bore, the winding having a pair of opposed ends; and
   a piston position determining circuit in communication with the winding, the circuit operable to sense the position of the piston relative to the winding.

2. The actuator according to claim 1, wherein:
   the piston position determining circuit is operable to energize the winding and to determine the current rise time or reactive voltage of the winding.

3. The actuator according to claim 1, wherein the sleeve includes an inner layer formed of a non-magnetic material, the inner layer having an outer surface, the winding being disposed on the outer surface of the inner layer.

4. The actuator according to claim 3, wherein the winding comprises a wire wrapped around the outer surface of the inner layer or an electrical trace defined on the outer surface of the inner layer.

5. The actuator according to claim 3, wherein the inner layer is formed of a non-magnetic material selected from the group consisting of phenolic, polymers, aluminum, non-magnetic stainless steel and brass.

6. The actuator according to claim 1, further comprising a second winding disposed about at least a portion of the longitudinal bore and an energizing circuit operable to energize the second winding, the piston position determining circuit being a sensing circuit operable to sense a voltage or current in the first winding in response to the energizing of the second coil.

7. The actuator according to claim 1, wherein the elongated sleeve is an inner sleeve having a pair of opposed ends, the actuator further comprising:
   a pair of end caps closing the ends of the inner sleeve; and
   an outer sensor sleeve disposed coaxially around the inner sleeve;
   the winding being disposed in or around the outer sleeve.

8. The actuator according to claim 1, further comprising:
   a pneumatic control valve operable to selectively supply pressurized gas to the bore on one side of the piston, thereby moving the piston.

9. The actuator according to claim 1, wherein the winding extends substantially the entire length of the sleeve.

10. The actuator according to claim 9, wherein the winding includes a plurality of turns formed in a single layer, each of the turns being adjacent a neighboring turn.

11. The actuator according to claim 1, wherein the piston is formed of a ferromagnetic material.

12. A position sensing system for a hydraulic or pneumatic actuator of the type having an elongated sleeve with a longitudinal bore defined therethru and a piston disposed in and movable along the bore, the piston including at least a portion of magnetic material, the sensing system comprising:
   a sensing sleeve having a receiving bore for receiving the actuator therein;
   a winding disposed around the receiving bore;
   a piston position determining circuit in communication with the winding, the circuit operable to sense the position of the piston relative to the winding.

13. A hydraulic or pneumatic actuator comprising:
   an elongated sleeve having a longitudinal bore defined therethru;
   a piston disposed in the bore and movable along the bore by pressurized hydraulic fluid or pressurized gas between a retracted position and an extended position, a portion of the piston extending from the sleeve in the extended position, the piston including at least a portion of magnetic material;
   a winding disposed around at least a portion of the longitudinal bore, the winding having a pair of opposed ends; and
   a piston position determining circuit in communication with the winding, the circuit operable to sense the position of the piston relative to the winding.

\* \* \* \* \*